US009378436B2

(12) United States Patent
Wang et al.

(10) Patent No.: US 9,378,436 B2
(45) Date of Patent: Jun. 28, 2016

(54) LOW PROFILE CONNECTOR

(71) Applicant: Molex, LLC, Lisle, IL (US)

(72) Inventors: Hong Liang Wang, Chengdu (CN);
Shang-Xiu Zeng, Chengdu (CN); Kian Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 52 days.

(21) Appl. No.: 14/157,218

(22) Filed: Jan. 16, 2014

(65) Prior Publication Data

US 2014/0315404 A1    Oct. 23, 2014

(30) Foreign Application Priority Data

Jan. 18, 2013  (CN) .......................... 2013 2 0028251
Jan. 18, 2013  (CN) .......................... 2013 2 0028685

(51) Int. Cl.
*G06K 13/08*    (2006.01)
(52) U.S. Cl.
CPC ...................................... *G06K 13/08* (2013.01)
(58) Field of Classification Search
USPC .......................................... 439/159, 188, 630
IPC .......... H01R 13/635,13/633, 13/6335, 13/7032;
G06K 13/0806
See application file for complete search history.

(56) References Cited

U.S. PATENT DOCUMENTS

| 6,033,243 | A | * | 3/2000 | Kajiura .......................... 439/159 |
| 6,042,401 | A | * | 3/2000 | Oguchi et al. ................ 439/159 |
| 7,540,778 | B2 | * | 6/2009 | Cheng ...................... 439/607.22 |
| 7,708,598 | B2 | | 5/2010 | Hu | |
| 8,597,038 | B2 | | 12/2013 | Yokoyama et al. | |
| 8,961,207 | B2 | * | 2/2015 | Lim et al. ...................... 439/159 |
| 2012/0129370 | A1 | | 5/2012 | Zhou et al. | |

FOREIGN PATENT DOCUMENTS

| CN | 2601469 Y | 1/2004 |
| CN | 202134690 U | 2/2012 |
| TW | 481379 U | 3/2002 |

* cited by examiner

*Primary Examiner* — Hien Vu
(74) *Attorney, Agent, or Firm* — Stephen L. Sheldon

(57) ABSTRACT

An electrical connector comprises an insulative unit, a shielding shell, a plurality of terminals and a card ejecting mechanism. The card ejecting mechanism comprises a shaft member, a lever member and a push rod. The shaft member has a base portion fixed to the insulative unit and a shaft portion extending from the base portion and protruding from the insulative unit. The lever member has an operating portion, a pushing portion and a shaft hole positioned between the operating portion and the pushing portion. The shaft hole receives the shaft portion therein and the lever member can rotate about the shaft portion between two positions. The push rod is provided correspondingly to the operating portion and slides under pushing from an external force to push the operating portion, so as to allow the lever member to rotate from the receiving position to the pushing position.

11 Claims, 14 Drawing Sheets

LOW PROFILE CONNECTOR

RELATED APPLICATIONS

This application claims priority to Chinese Application No. 201320028251.1, filed Jan. 18, 2013, and to Chinese Application No. 201320028685.1, filed Jan. 18, 2013, both of which are incorporated herein by reference in their entirety.

TECHNICAL FIELD

The present disclosure relates to an electrical connector, and particularly relates to an electrical connector for electrically connecting an electronic card.

BACKGROUND ART

Generally, a connector for electrically connecting an electronic card having a small size, such as a SIM card, is usually provided with a card ejecting mechanism to facilitate a user to eject the electronic card. For example, Chinese patent publication No. CN102651505A (corresponding to U.S. patent publication No. US2012/0220146A1) discloses a connector comprising an eject member. The eject member is rotatably provided on a top plate of a metal shell, and the top plate of the metal shell is punched and bent to form a pivoting shaft member inserted into a shaft hole formed to the eject member, so as to allow the eject member to rotate about the pivoting shaft member to eject the electronic card.

As the thickness of the metal shell is not too large, the top plate has resiliency and may be displaced up and down slightly, and the pivoting shaft member would move up and down along with the top plate because the pivoting shaft member is integrally connected to the top plate, as a result, the pivoting shaft member has the risk of disengagement from the shaft hole of the eject member. Furthermore, because the thickness of the metal shell is limited, the supporting strength of the pivoting shaft member having the same thickness as the metal shell is probably insufficient.

SUMMARY OF THE INVENTION

An electrical connector comprises an insulative unit, a shielding shell, a plurality of terminals fixed to the insulative unit, and a card ejecting mechanism. The shielding shell defines a receiving space together with the insulative unit and has a top plate portion. The card ejecting mechanism comprises a shaft member, a lever member and a push rod. The shaft member has a base portion and a shaft portion extending from the base portion. The base portion is fixed to the insulative unit, and the shaft portion protrudes from the insulative unit toward the top plate portion. The lever member has an operating portion, a pushing portion and a shaft hole positioned between the operating portion and the pushing portion. The shaft hole allows insertion of the shaft portion therein, the lever member is capable of rotating about the shaft portion between a receiving position and a pushing position, and in the receiving position, the pushing portion is positioned outside the receiving space, in the pushing position, the pushing portion enters into the receiving space. The push rod is provided correspondingly to the operating portion and is capable of sliding back and forth along a card insertion direction, is capable of sliding under pushing from an external force to push the operating portion, so as to allow the lever member to rotate from the receiving position to the pushing position.

In an embodiment, the shaft portion and the shaft hole are elongated correspondingly to each other, and both ends of the shaft hole are wider than the middle part to limit the rotation range of the lever member. In an embodiment, the base portion of the shaft member protrudes further toward the both sides than the shaft portion. In an embodiment, the base portion of the shaft member is embedded in the insulative unit and one side of the base portion opposite to the top plate portion is exposed from the insulative unit to be soldered to a circuit board. In an embodiment, the shielding shell is formed by punching and bending a metal plate, the shaft member is formed by punching and bending another metal plate, and the thickness of the metal plate forming the shaft member is greater than the thickness of the metal plate forming the shielding shell. In an embodiment, the electrical connector further comprises a detection switch, the detection switch comprises an abutting portion formed to the shielding shell and a detection terminal provided to the insulative unit, the detection terminal has a fixed portion embedded in the insulative unit, a resilient arm extending out of the insulative unit from the fixed portion toward the abutting portion and a soldering portion extending out of the insulative unit from the fixed portion toward the direction opposite to the top plate portion, the resilient arm has a pushed portion protruding toward the receiving space in a curved manner and a contact portion formed at a distal end of the resilient arm to contact the abutting portion, the pushed portion is capable of being pushed so as to change the state of the electrical connection between the contact portion and the abutting portion.

In an embodiment, the abutting portion is a protruding piece extending integrally from the shielding shell. In an embodiment, the insulative unit comprises a main body and a mounting block which are separated from each other, the mounting block is positioned at the opposite side of an entrance of the receiving space, and the main body is positioned between the mounting block and the entrance of the receiving space, the plurality of terminals are fixed to the main body, the shaft member and the detection terminal are provided to the mounting block, and the lever member are supported by the mounting block. In an embodiment, the shielding shell further has a sliding groove extending along the card insertion direction to receive the push rod and a limiting arm extending into the sliding groove, the push rod has a recessed portion whose position corresponds to the limiting arm, thereby limiting the push rod to slide in the sliding groove.

In an embodiment, the electrical connector further comprises a tray received in the receiving space and capable of moving in and out of the receiving space along the card insertion direction; and in the pushing position, the pushing portion enters into the receiving space to push the tray. In an embodiment, the tray has a carrying portion for carrying an electronic card and a grasping portion connected to the carrying portion, the carrying portion is received in the receiving space, the grasping portion is positioned outside the receiving space and has a through hole whose position corresponds to the push rod, the push rod can be pushed by a pin-shaped member inserted via the through hole. In an embodiment, the tray is formed from a metal supporting plate and a plastic frame by insert molding, the periphery of the metal supporting plate is embedded in the plastic frame.

BRIEF DESCRIPTION OF THE DRAWINGS

The present invention is illustrated by way of example and not limited in the accompanying figures in which like reference numerals indicate similar elements and in which.

DETAILED DESCRIPTION OF THE PREFERRED EMBODIMENTS

Figure 1:
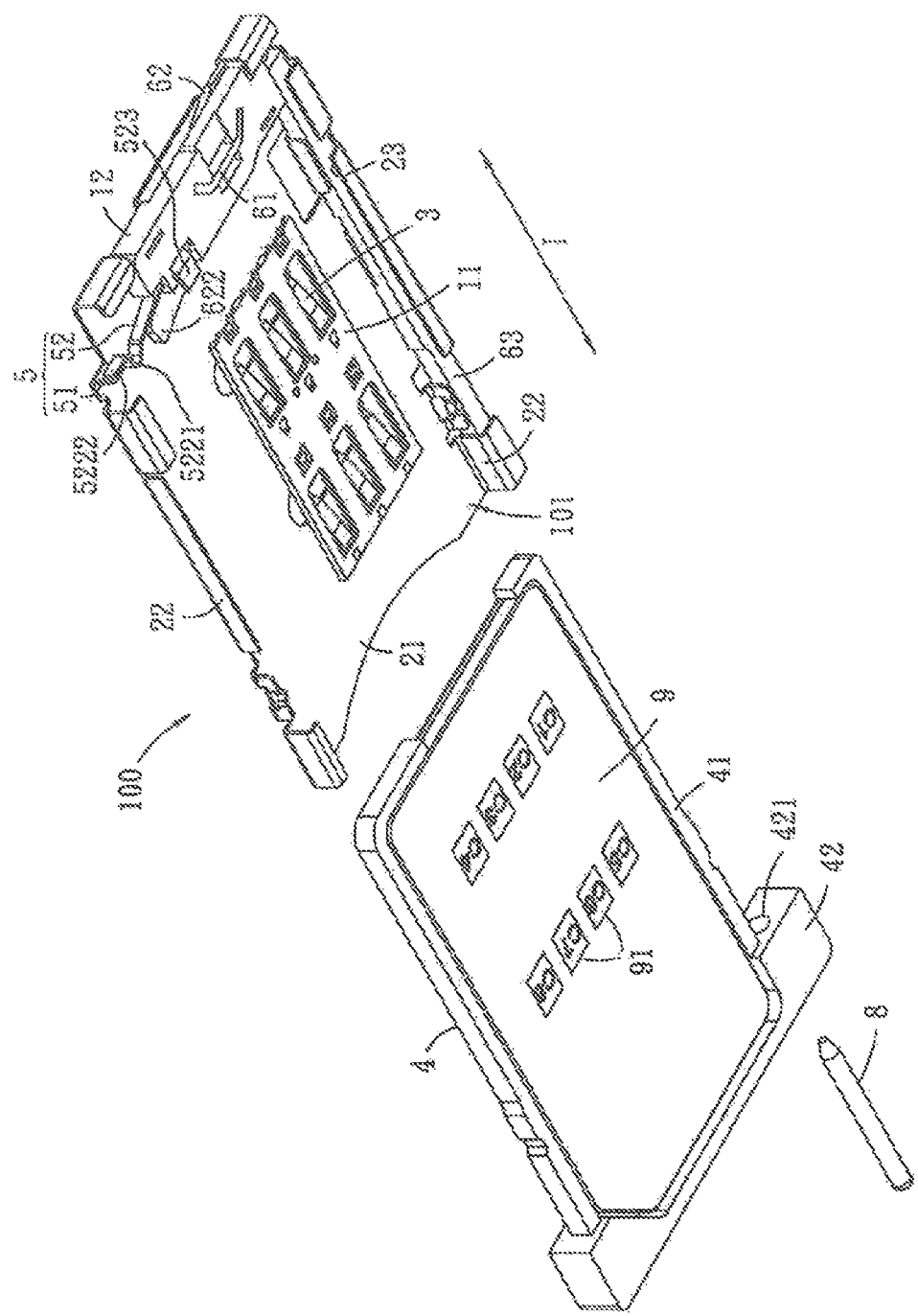
FIG. 1 is a perspective view illustrating an unassembled state of a tray, which carries an electronic card, of an embodiment of an electrical connector of the present disclosure.
Figure 2:
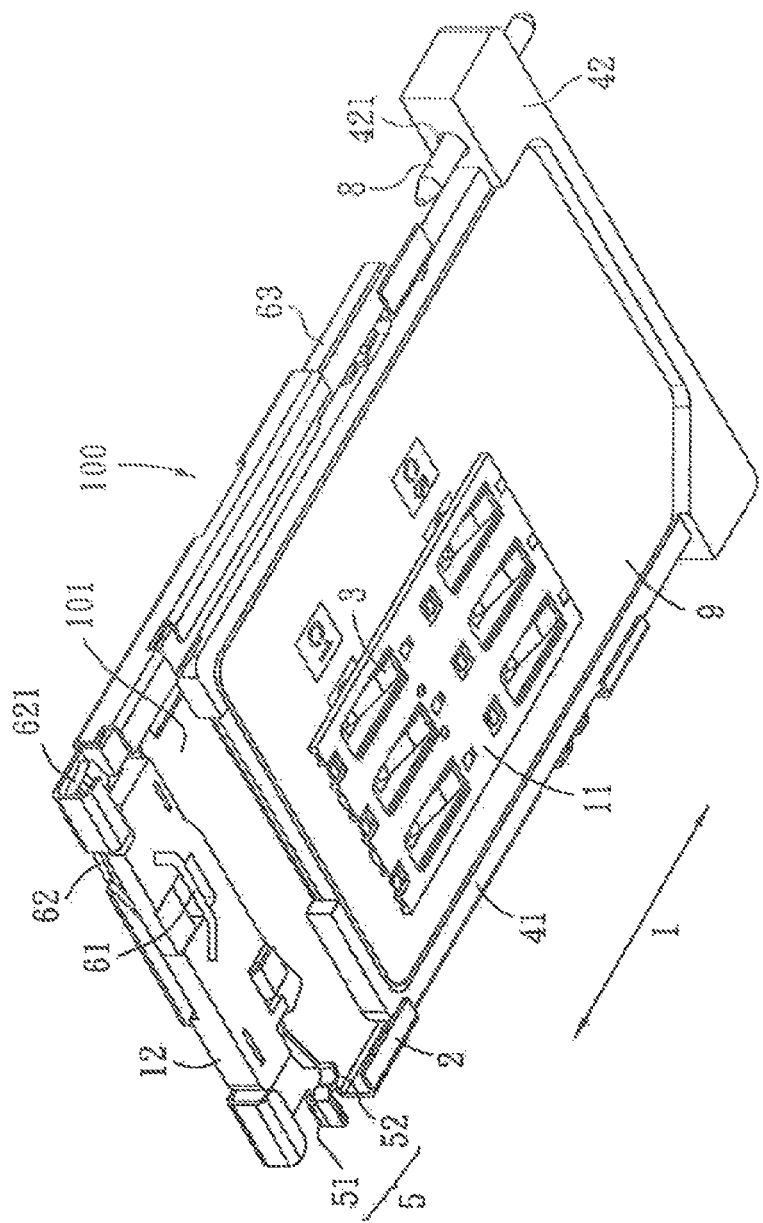
FIG. 2 is a perspective view illustrating the state that the tray of the embodiment is received in a receiving space.
Figure 3:
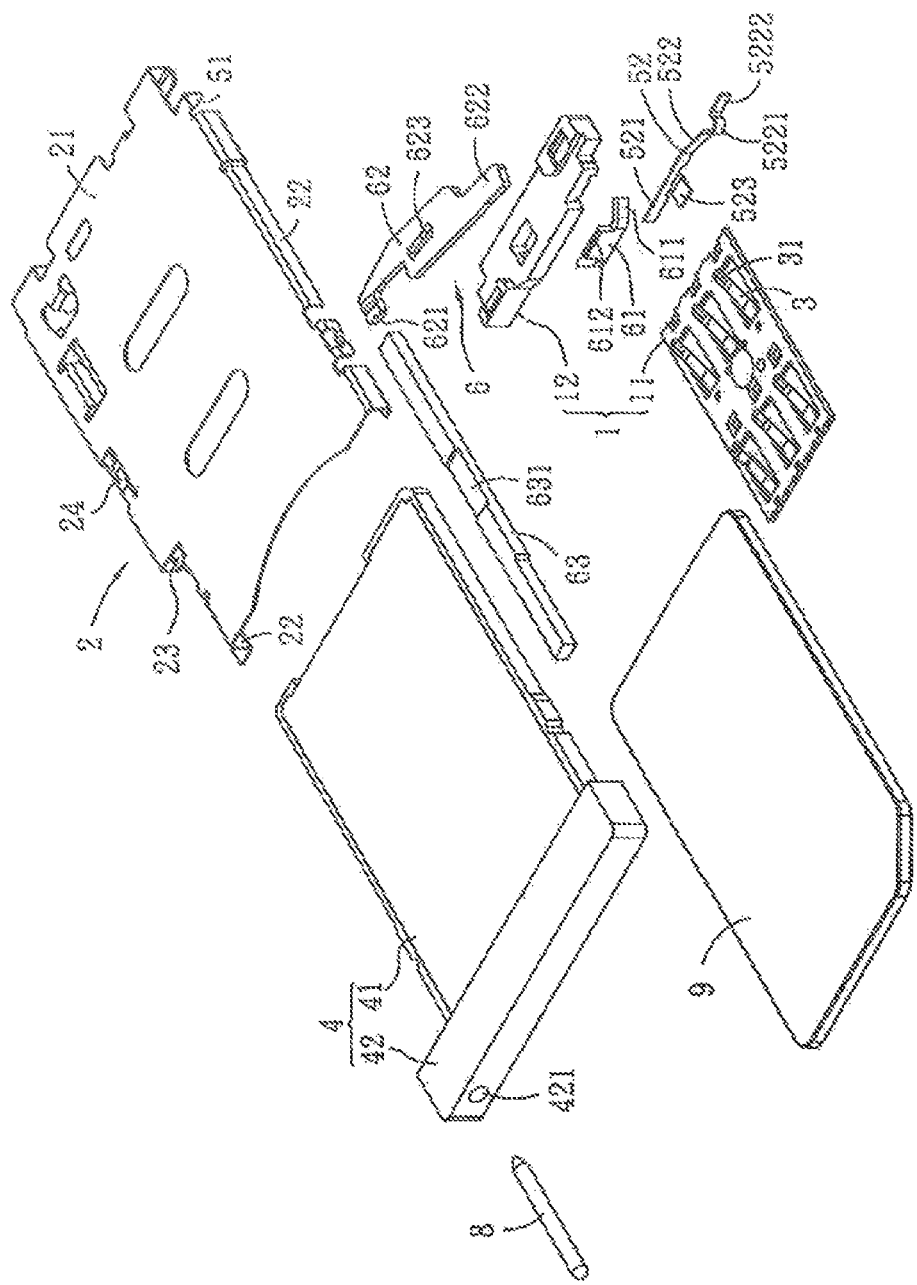
FIG. 3 is an exploded perspective view illustrating each component of the embodiment.
Figure 4:
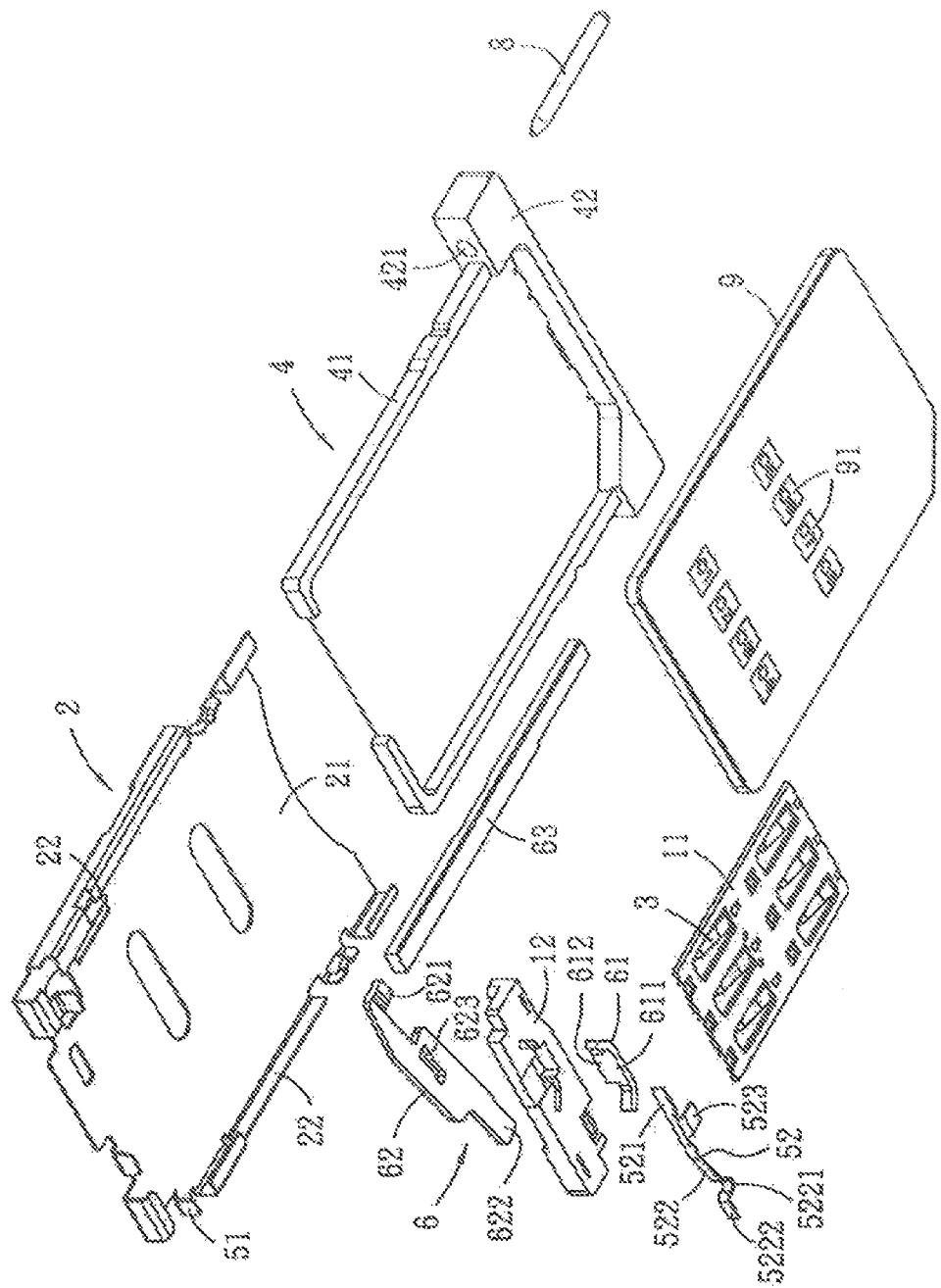
FIG. 4 is a view of FIG. 3 viewed from another angle.
Figure 5:
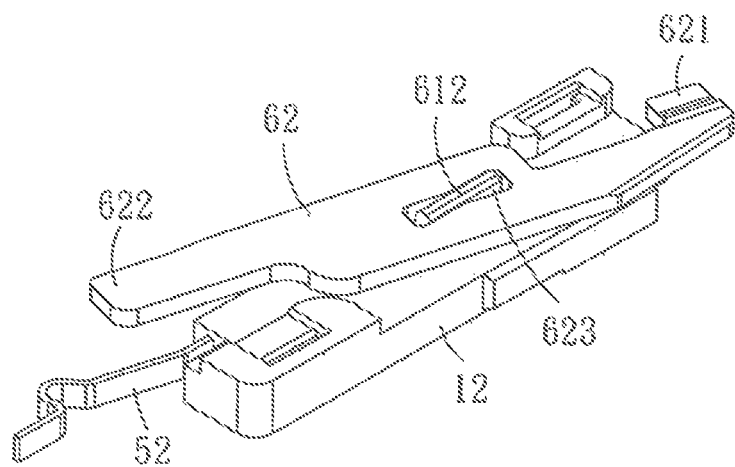
FIG. 5 is a perspective view illustrating the assembling relationship among a mounting block and a shaft member, and a lever member of the embodiment.

The foregoing and other technical contents, features and effects of the present disclosure will be apparent through the following detailed description for an embodiment in combination with the drawings. One effect of the present disclosure is that the shaft member of the card ejecting mechanism and the shielding shell can be independent and can be manufactured separately. By that the base portion is fixed to the insulative unit, the stability of the engagement between the shaft member and the insulative unit is increased, and then assembling of the lever member and the shaft member are more stable, so as to prevent the shaft hole from disengaging from the shaft portion. Furthermore, the shaft member can be formed from a thicker metal plate, thereby increasing the structural strength of the shaft member, and the shaft member is not easily deformed by collision due to rotation of the lever member. Accordingly, an object of the present disclosure is to provide an electrical connector having a card ejecting mechanism which has a stable structure.

Referring to FIGS. 1-4, an embodiment of the electrical connector 100 of the present disclosure is mounted to a circuit board (not shown in the Figures) for electrically connecting an electronic card 9, such as a SIM card. The electrical connector 100 comprises an insulative unit 1, a shielding shell 2, a plurality of terminals 3, a tray 4, a detection switch 5 and a card ejecting mechanism 6. The shielding shell 2 and the insulative unit 1 together define a receiving space 101 for receiving the tray 4. The tray 4 can move in and out of the receiving space 101 along a card insertion direction I.

The insulative unit 1 comprises a main body 11 and a mounting block 12 which are separated from each other. The mounting block 12 is positioned at the opposite side of an entrance of the receiving space 101, and the main body 11 is positioned between the mounting block 12 and the entrance of the receiving space 101. The shielding shell 2 is formed by punching and bending a metal plate, and has a top plate portion 21 facing and spaced apart from the main body 11, and two side plate portions 22 respectively connected to both sides of the top plate portion 21 parallel to the card insertion direction I to define a periphery of the receiving space 101.

The plurality of terminals 3 are fixed to the main body 11 of the insulative unit 1, each have a resilient contact portion 31 protruding into the receiving space 101 so as to contact a conductive pad 91 of the electronic card 9 to form an electrical connection. The tray 4 has a carrying portion 41 for carrying the electronic card 9 and a grasping portion 42 connected to the carrying portion 41. The carrying portion 41 is received in the receiving space 101, and the grasping portion 42 is positioned outside the receiving space 101.

The detection switch 5 comprises an abutting portion 51 formed to the shielding shell 2 and a detection terminal 52 provided to the mounting block 12 of the insulative unit 1. In the embodiment, the abutting portion 51 is a protruding piece extending integrally from the shielding shell 2, but in an equivalent embodiment, the abutting portion 51 can also be any part of the shielding shell 2 correspondingly contacting the detection terminal 52. The detection terminal 52 has a fixed portion 521 embedded in the mounting block 12, a resilient arm 522 extending out of the mounting block 12 from the fixed portion 521 toward the abutting portion 51 and a soldering portion 523 extending out of the mounting block 12 from the fixed portion 521 toward the direction opposite to the top plate portion 21 to be soldered to the circuit board. The resilient arm 522 has a pushed portion 5221 protruding toward the receiving space 101 in an curved manner and a contact portion 5222 formed at a distal end of the resilient arm 522 to contact the abutting portion 51, the pushed portion 5221 can be pushed so as to change the state of the electrical connection between the contact portion 5222 and the abutting portion 51.

In the embodiment, the contact portion 5222 is held in contact with the abutting portion 51 to establish the electrical connection therebetween when the pushed portion 5221 has not been pushed, and is disengaged from the abutting portion 51 to cause the electrical disconnection therebetween when the pushed portion 5221 is pushed away. In an equivalent embodiment, the contact portion 5222 can be also held in disengagement from the abutting portion 51 to cause the electrical disconnection therebetween when the pushed portion 5221 has not been pushed, and contacts the abutting portion 51 to establish the electrical connection therebetween when the pushed portion 5221 is pushed.

Figure 6:
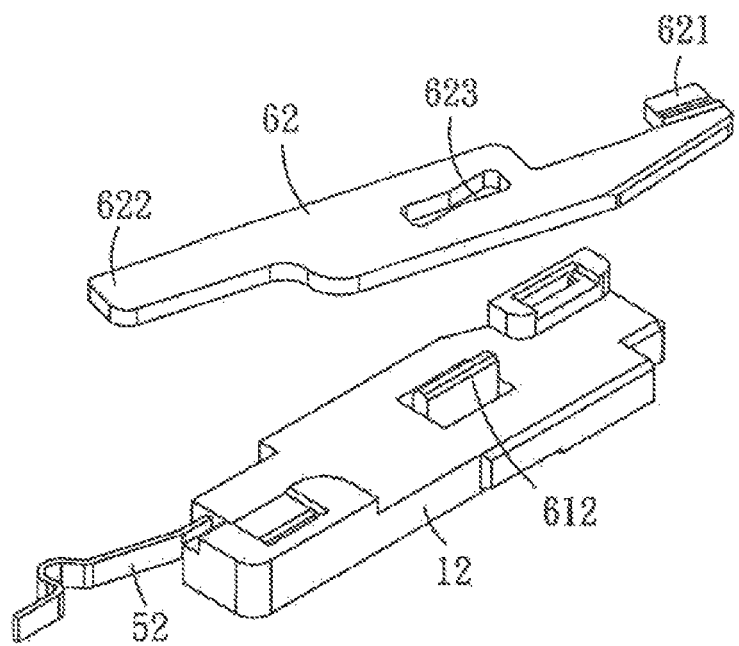
FIG. 6 is an exploded perspective view illustrating the assembling relationship among the mounting block, and the shaft member and a detection terminal in the embodiment.
Figure 7:
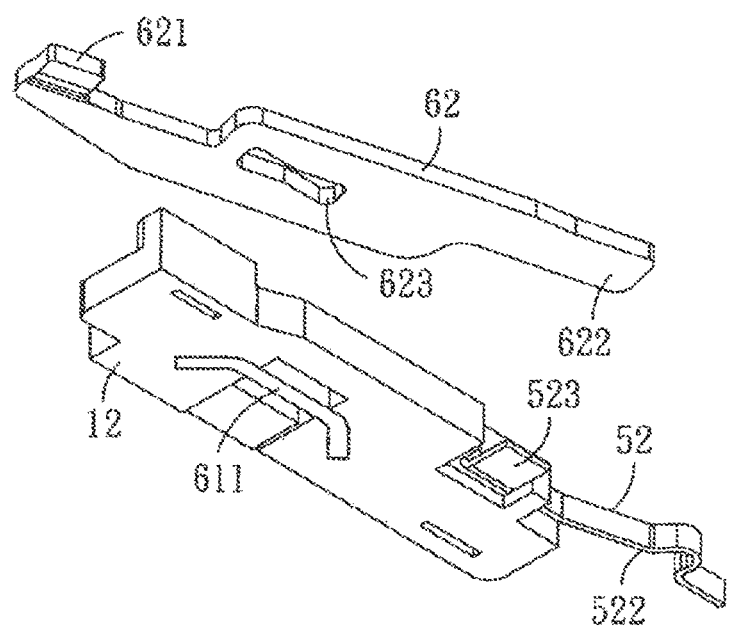
FIG. 7 is a view of FIG. 6 viewed from another angle.
Figure 8:
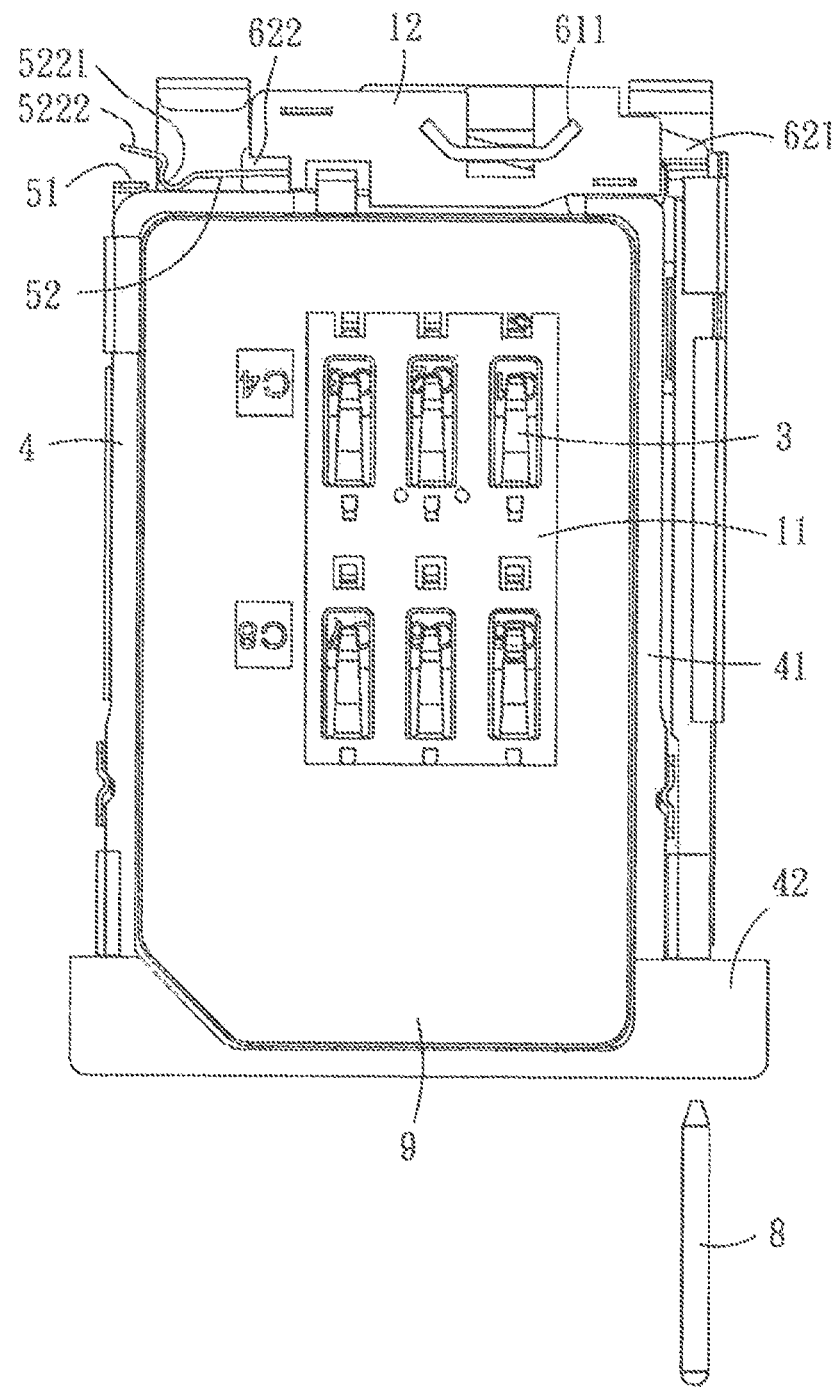
FIG. 8 is a bottom view illustrating the operative relationship between the tray and the detection switch of the embodiment.
Figure 9:
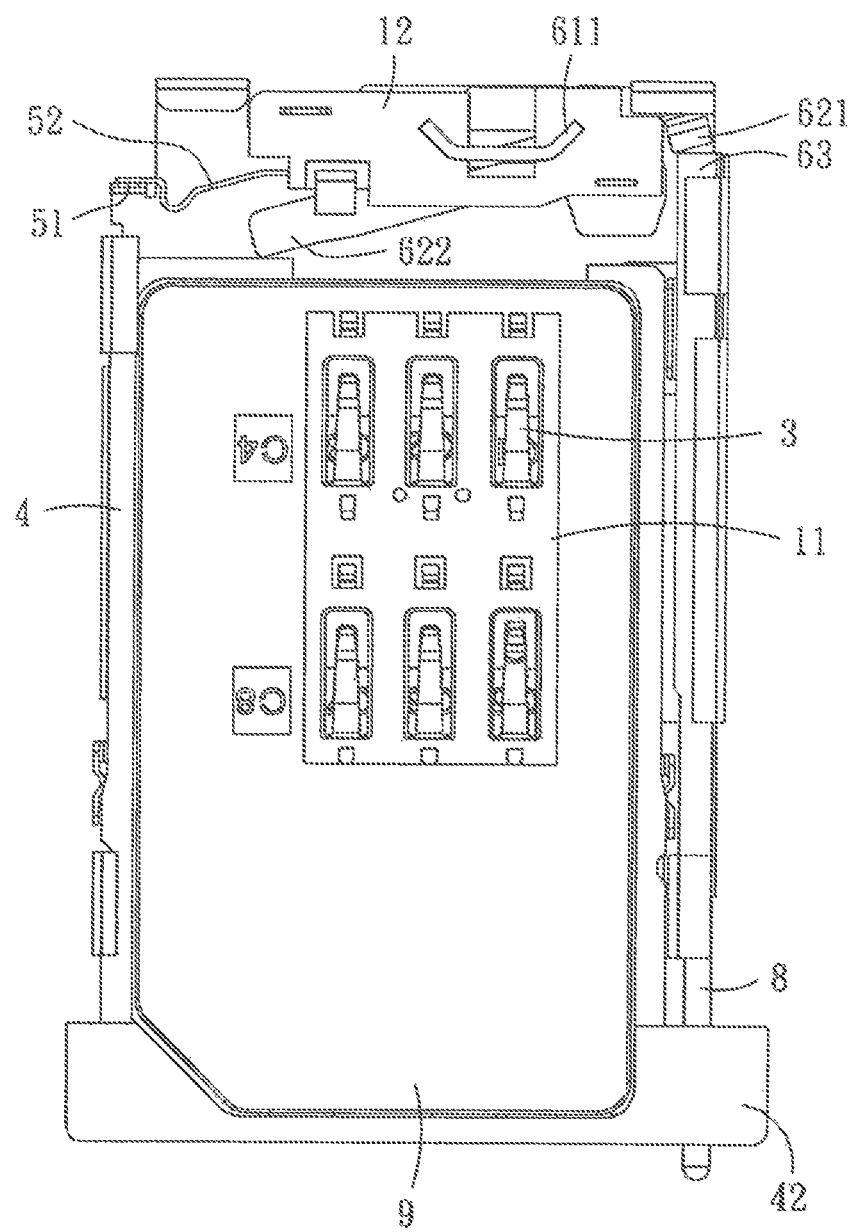
FIG. 9 is a bottom view illustrating the operative relationship between the card ejecting mechanism and the tray of the embodiment.

The card ejecting mechanism 6 comprises a shaft member 61, a lever member 62 and a push rod 63. In combination with referring to FIGS. 6-7, the shaft member 61 has a base portion 611 fixed to the mounting block 12 and a shaft portion 612 extending from the base portion 611 and protruding from the mounting block 12 toward the top plate portion 21. The lever member 62 has an operating portion 621, a pushing portion 622 and a shaft hole 623 positioned between the operating portion 621 and the pushing portion 622. The shaft hole 623 allows insertion of the shaft portion 612 therein, so that the lever member 62 is supported by the mounting block 12 and can rotate about the shaft portion 612 between a receiving position (as shown in FIG. 8) and a pushing position (as shown in FIG. 9). The push rod 63 is provided correspondingly to the operating portion 621 and can slide back and forth along the card insertion direction I. The shielding shell 2 further has a sliding groove 23 extending along the card insertion direction I to receive the push rod 63 and a limiting arm 24 extending into the sliding groove 23. The push rod 63 has a recessed portion 631 whose position corresponds to the limiting arm 24, thereby limiting the push rod 63 to slide in the sliding groove 23, without coming out of the sliding groove 23. In addition, the grasping portion 42 of the tray 4 has a through hole 421 whose position corresponds to the push rod 63, the push rod 63 can be pushed by a pin-shaped member 8 inserted via the through hole 421.

In the embodiment, the shaft portion 612 of the shaft member 61 and the shaft hole 623 of the lever member 62 are elongated correspondingly to each other, and both ends of the shaft hole 623 are wider than the middle part, so as to allow the lever member 62 to rotate and limit the rotation range of the lever member 62. The base portion 611 of the shaft member 61 protrudes further toward both sides than the shaft portion 612 and is embedded in the mounting block 12, and one side of the base portion 611 opposite to the top plate portion 21 of the shielding shell 2 is exposed from the mounting block 12 to be soldered to the circuit board. By that the length of the base portion 611 is greater than that of the shaft portion 612 and the base portion 611 is fixed to the mounting block 12, the stability of engagement between the shaft member 61 and the mounting block 12 can be increased, and the base portion 611 has a large soldering area to provide a large board gripping force so as to be securely fixed to the circuit board, so that the shaft member 61 is positioned more stably and will not move up and down, and then the assembling of the lever member 62 and the shaft member 61 is more stable, so as to prevent the shaft hole 623 from coming out of the shaft portion 612. Furthermore, the shaft member 61 is independent of the shielding shell 2, can be formed by punching and bending another metal plate, preferably, the thickness of the metal plate forming the shaft member 61 is greater than the thickness of the metal plate forming the shielding shell 2, thereby increasing the structural strength of the shaft member 61, and the shaft member 61 is not easily deformed by collision due to rotation of the lever member 62.

In addition, in the embodiment, the main body 11 and the mounting block 12 of the insulative unit 1 are separately formed, which facilitates that the mounting block 12, and the detection terminal 52 and the shaft member 61 are formed together by insert molding, so that manufacturing is easy and the main body 11 and the mounting block 12 are not easy to warp. However, in other embodiment, the main body 11 can also extend to integrally connect the mounting block 12.

Referring to FIG. 8, when the tray 4 carrying the electronic card 9 is inserted into the receiving space 101 along the card insertion direction I, the carrying portion 41 of the tray 4 is received in the receiving space 101, and the grasping portion 42 abuts distal ends of the two side plate portions 22 of the shielding shell 2. An end edge of the tray 4 close to the mounting block 12 pushes the pushed portion 5221 of the detection terminal 52, so that the contact portion 5222 and the abutting portion 51 are separated from each other to cause the electrical disconnection therebetween. As the detection switch 5 is positioned at the opposite side of the entrance of the receiving space 101, namely is positioned at the innermost position of the receiving space 101, it can be ensured that the detection switch 5 is actuated only after the tray 4 enters into the receiving space 101 and reaches a receiving position, so as to avoid incorrect detection.

Referring to FIG. 9, when the tray 4 will be ejected from the receiving space 101, the pin-shaped member 8 is inserted into the through hole 421 (referring to FIG. 1) of the tray 4 to push the push rod 63, the push rod 63 slides due to pushing from the pin-shaped member 8 to push the operating portion 621 of the lever member 62, so as to allow the lever member 62 to rotate from the receiving position (referring to FIG. 8) to the pushing position (referring to FIG. 9). The pushing portion 622 of the lever member 62 is positioned outside the receiving space 101 when the lever member 62 is in the receiving position, and the pushing portion 622 enters into the receiving space 101 to push the tray 4 when the lever member 62 is in the pushing position, so as to allow the grasping portion 42 of the tray 4 farther away from the receiving space 101. Because the electrical connector 100 is generally provided in an outer casing of an electronic device (not shown in the Figures) and close to an edge of the outer casing, the grasping portion 42 of the tray 4 is pushed away for a distance from the receiving space 101 via the lever member 62, the grasping portion 42 is pushed out of the edge of the outer casing of the electronic device, so as to facilitate the user grasping. And when the tray 4 is received in the receiving space 101 (see FIG. 8) again, the pushing portion 622 can be pushed back to the receiving position by the tray 4, and the operating portion 621 and the push rod 63 are driven to return to the receiving position simultaneously for the next operation.

Figure 10:
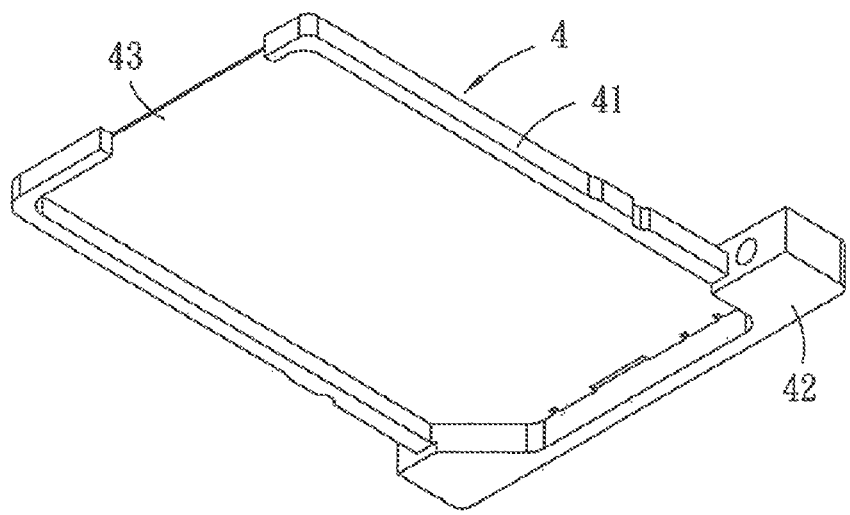
FIG. 10 is a perspective view illustrating an embodiment of a tray.
Figure 11:
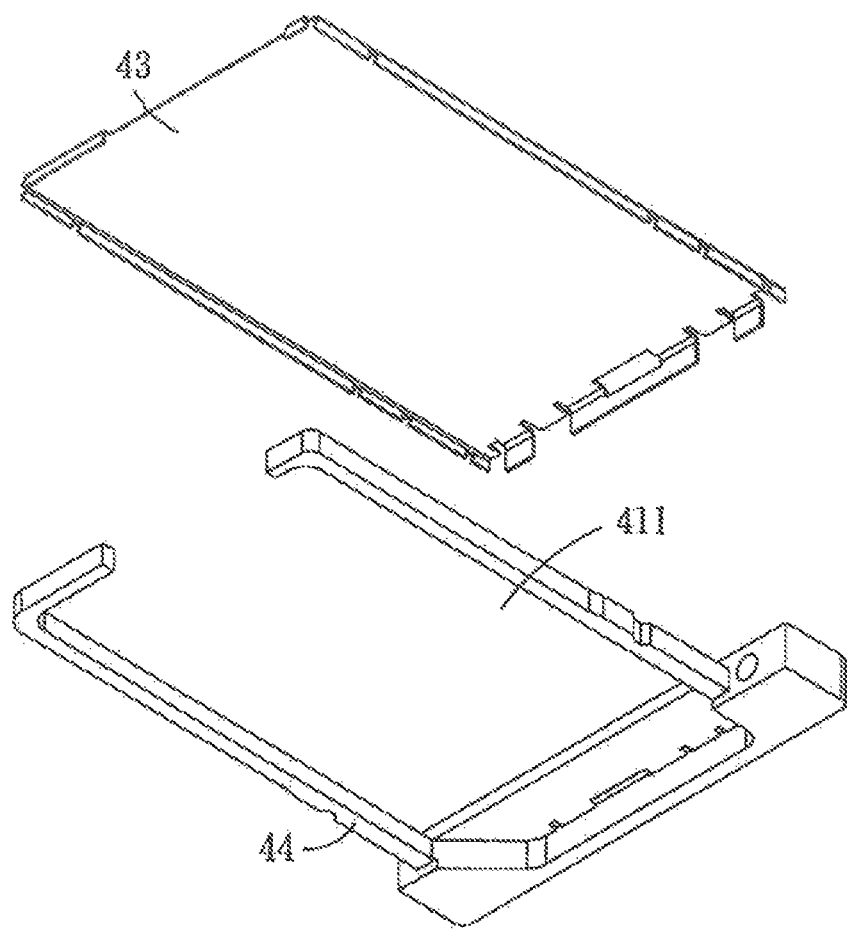
FIG. 11 is an exploded perspective view illustrating the embodiment of the tray depicted in FIG. 10.
Figure 12:
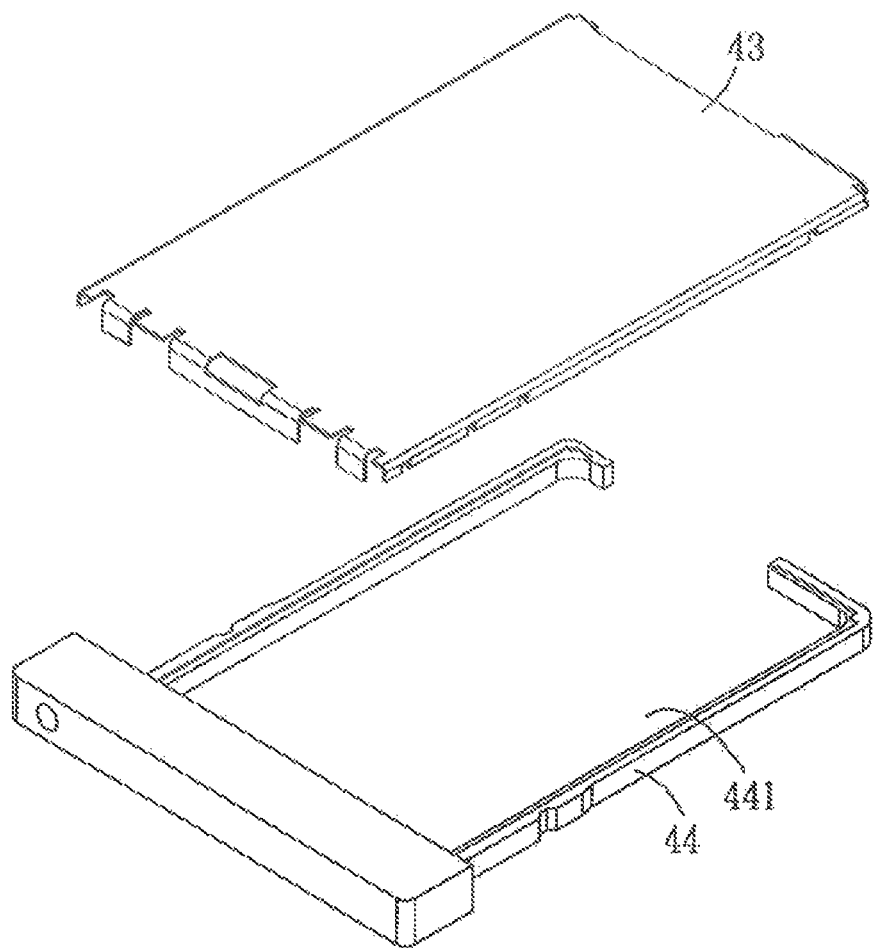
FIG. 12 is a view of FIG. 11 viewed from another angle.
Figure 13:
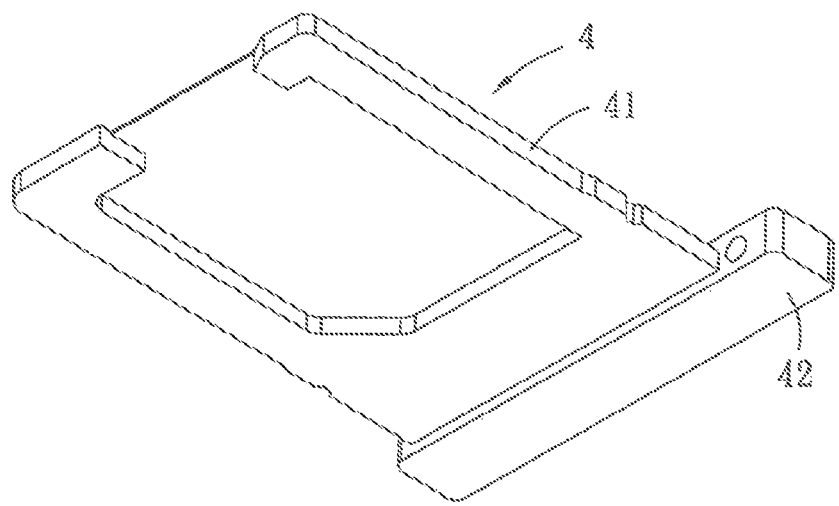
FIG. 13 is a perspective view illustrating an embodiment of a tray.
Figure 14:
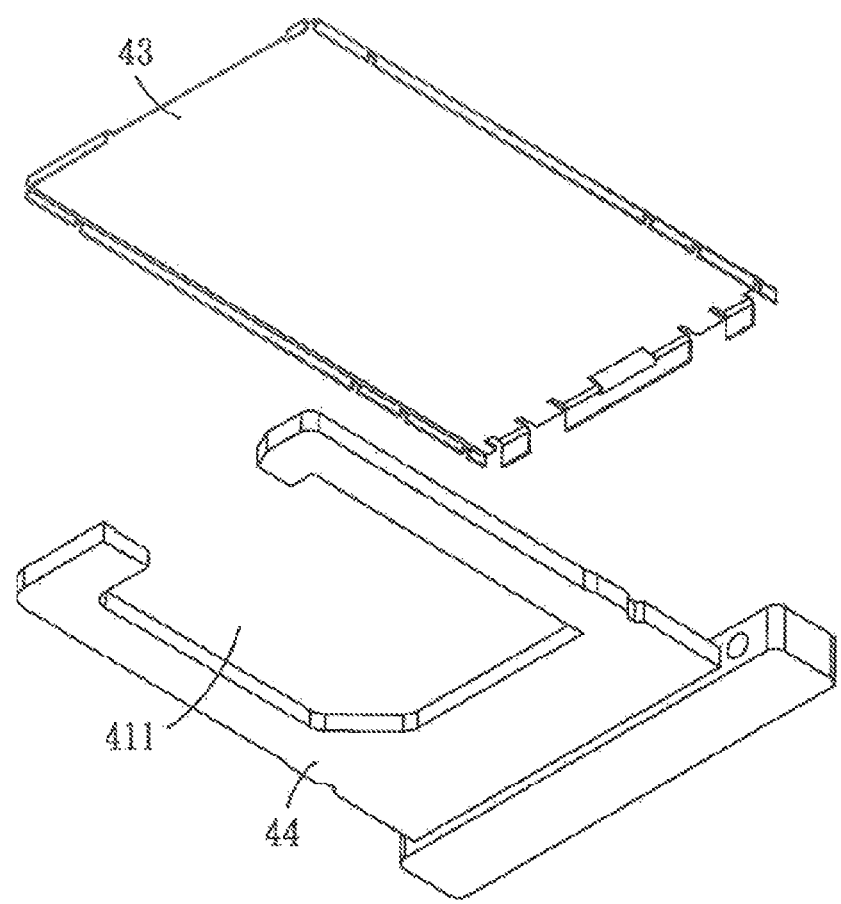
FIG. 14 is an exploded perspective view illustrating the embodiment of the tray depicted in FIG. 13.
Figure 15:
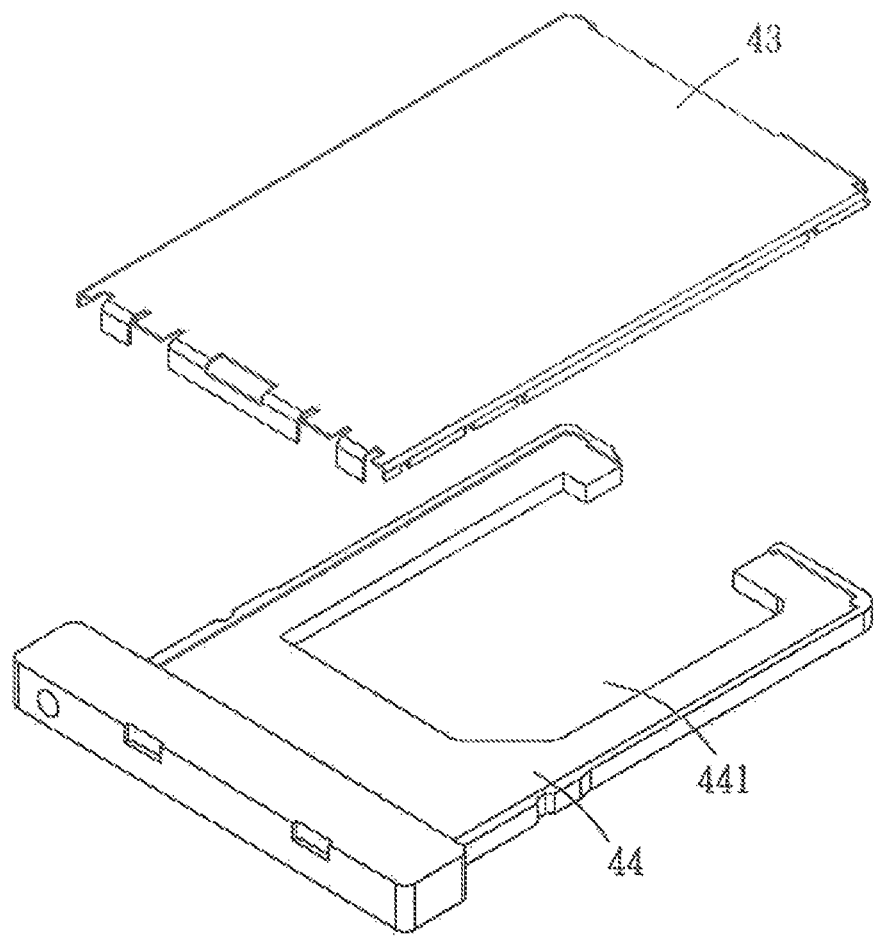
FIG. 15 is another perspective view of the embodiment depicted in FIG. 14.
Figure 16:
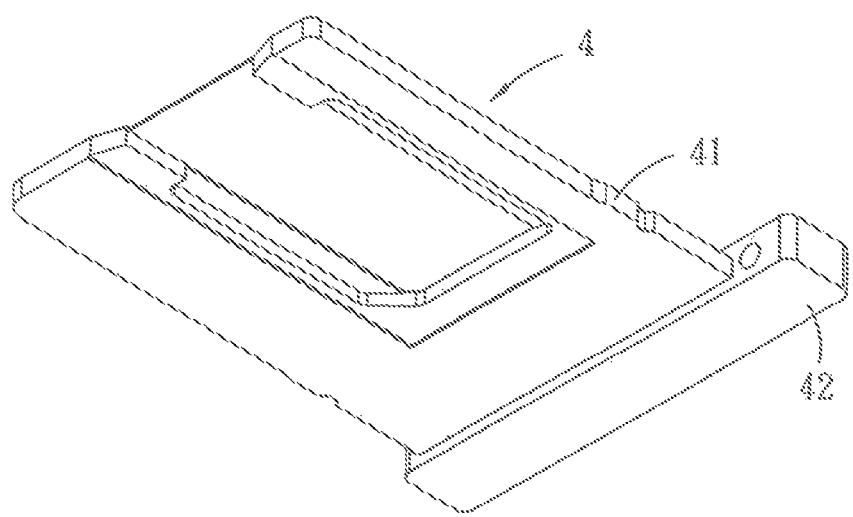
FIG. 16 is a perspective view of another embodiment of a tray.
Figure 17:
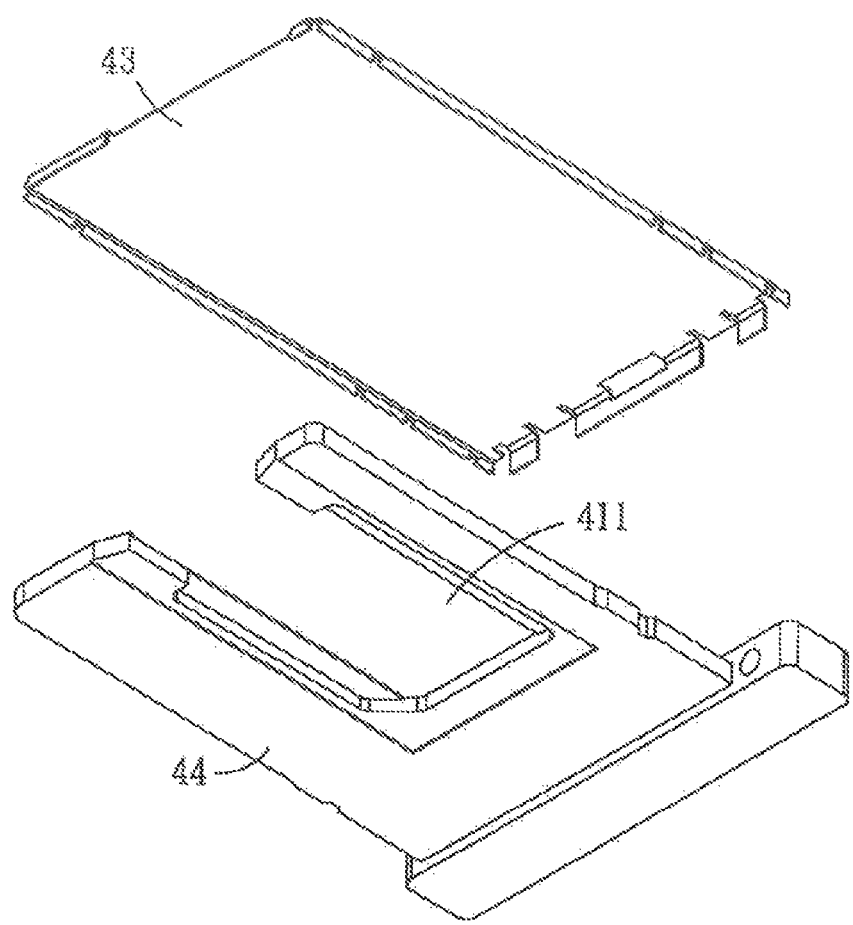
FIG. 17 is an exploded perspective view illustrating the embodiment of the tray depicted in FIG. 16.
Figure 18:
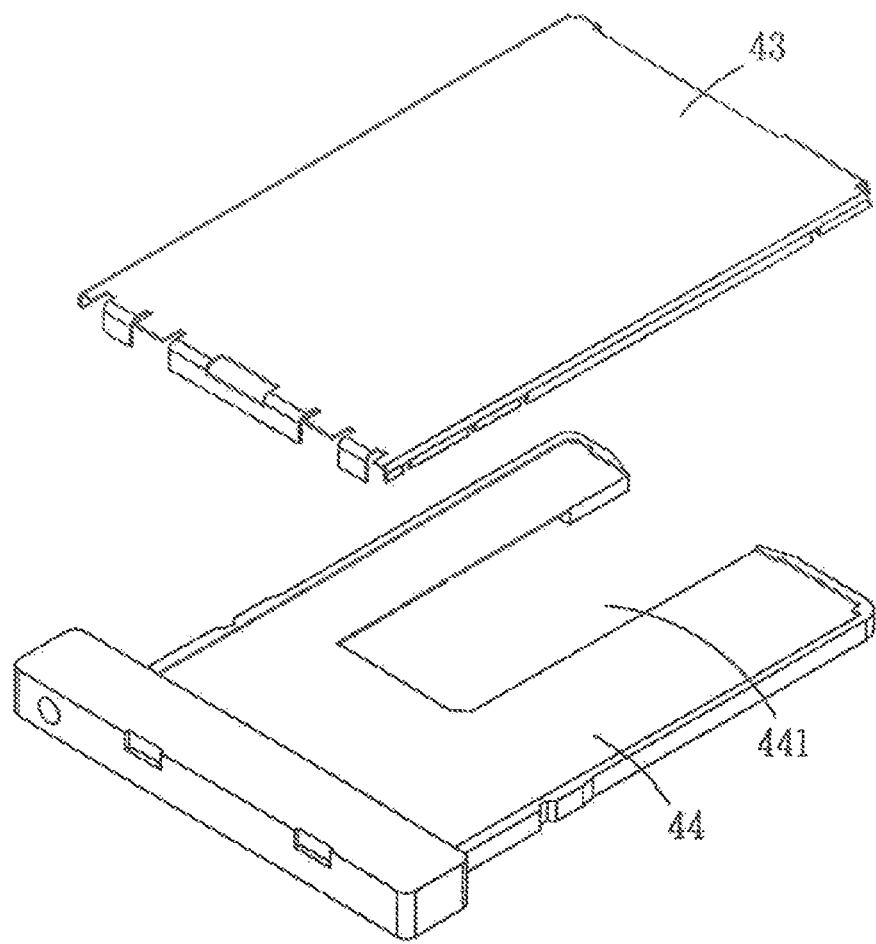
FIG. 18 is another perspective view of the embodiment depicted in FIG. 17.

Referring to FIGS. 10-12, the tray 4 is formed from a metal supporting plate 43 and a plastic frame 44 by insert molding, the periphery of the metal supporting plate 43 is embedded in the plastic frame 44, and most part of the metal supporting plate 43 is positioned at the carrying portion 41, thereby increasing the structural strength of the tray 4. In the embodiment, the tray 4 is explained by the specification for carrying a mini-SIM card as an example, so a space 441 receiving the electronic card 9 defined by the plastic frame 44 is large. Similarly, referring to FIGS. 13-15, when used for the micro-SIM card having a small size, the space 441 receiving the electronic card 9 defined by the plastic frame 44 becomes small, so as to match the size of the micro-SIM card. Also, referring to FIGS. 16-18, when used for the nano-SIM card having a smaller size, the space 441 receiving the electronic card 9 defined by the plastic frame 44 becomes smaller, so as to match the size of the nano-SIM card.

In conclusion, in the embodiment, the shaft member 61 of the card ejecting mechanism 6 and the shielding shell 2 are independent, can be manufactured separately. By that the base portion 611 is fixed to the insulative unit 1, the stability of the engagement between the shaft member 61 and the insulative unit 1 is increased, and then assembling of the lever member 62 and the shaft member 61 are more stable, so as to prevent the shaft hole 623 from disengaging from the shaft portion 612. Furthermore, the shaft member 61 can be formed from a thicker metal plate, thereby increasing the structural strength of the shaft member 61, and the shaft member 61 is not easily deformed by collision due to rotation of the lever member 62. Therefore, the whole structure of the card ejecting mechanism 6 of the embodiment is more stable.

However, the above described are only the specific embodiments, which cannot limit the scope of the implementation of the present disclosure, namely simple equivalent variations and modifications made according to the scope of the claims and content of the present disclosure are still fallen within the scope of the present disclosure.

What is claimed is:

1. An electrical connector, comprising:
   an insulative unit having a main body and a mounting block;
   a shielding shell having a top plate portion and a sliding groove, the top plate portion and the insulative unit together defining a receiving space;
   a plurality of terminals fixed to main body; and
   a card ejecting mechanism comprising:
   a shaft member positioned in the mounting block and having a base portion and a shaft portion extending from the base portion, the base portion being fixed to the mounting block and the shaft portion protruding from the insulative unit toward the top plate portion;
   a lever member supported over the mounting block and having an operating portion, a pushing portion and a shaft hole positioned between the operating portion and the pushing portion, the shaft hole mounted on the shaft portion, the lever member being capable of rotating about the shaft portion between a receiving position and a pushing position, wherein the pushing portion is outside the receiving space when in the receiving position and is in the receiving space when in the pushing position; and
   a push rod positioned in the sliding groove and configured to slide back and forth along a card insertion direction, wherein in operation an external force causes the push rod to push the operating portion, so as to allow the lever member to rotate from the receiving position to the pushing position.

2. The electrical connector according to claim 1, wherein the shaft portion and the shaft hole are both elongated and both ends of the shaft hole are wider than the middle part to limit the rotation range of the lever member.

3. The electrical connector of claim 2, wherein the base portion of the shaft member extends further than the shaft portion.

4. The electrical connector of claim 3, wherein the base portion of the shaft member is exposed from the mounting block so as to allow it, in operation, to be soldered to a circuit board.

5. The electrical connector of claims 4, wherein the shielding shell is formed by punching and bending a metal plate, the shaft member is formed by punching and bending another metal plate, and the thickness of the metal plate forming the shaft member is greater than the thickness of the metal plate forming the shielding shell.

6. The electrical connector of claim 1, further comprising a detection switch, the detection switch comprising an abutting portion formed to the shielding shell and a detection terminal supported by the mounting block, the detection terminal having a fixed portion embedded in the mounting block, a resilient arm extending out of the mounting block from the fixed portion toward the abutting portion and a soldering portion extending out of the mounting block from the fixed portion toward the direction opposite to the top plate portion, the resilient arm having a pushed portion protruding toward the receiving space in a curved manner and a contact portion formed at a distal end of the resilient arm to contact the abutting portion, the pushed portion being capable of being pushed so as to change the state of the electrical connection between the contact portion and the abutting portion.

7. The electrical connector of claim 6, wherein the abutting portion is a protruding piece extending integrally from the shielding shell.

8. The electrical connector of claim 7, wherein the shielding shell has a limiting arm extending into the sliding groove and the push rod has a recessed portion whose position corresponds to the limiting arm, thereby limiting the push rod to slide in the sliding groove.

9. The electrical connector of claim 1, further comprising a tray received in the receiving space, the tray configured to slide in and out of the receiving space along the card insertion direction, wherein the pushing portion entering into the receiving space acts to push the tray.

10. The electrical connector of claim 9, wherein the tray has a carrying portion for carrying an electronic card and a grasping portion connected to the carrying portion, the carrying portion is received in the receiving space, the grasping portion is positioned outside the receiving space and has a through hole whose position corresponds to the push rod, wherein the push rod can, in operation, be pushed by a pin-shaped member inserted via the through hole.

11. The electrical connector of claim 9, wherein the tray is formed from a metal supporting plate and a plastic frame by insert molding and a periphery of the metal supporting plate is embedded in the plastic frame.

* * * * *